United States Patent
Subhash et al.

(10) Patent No.: US 9,604,885 B2
(45) Date of Patent: Mar. 28, 2017

(54) SYNTHESIS AND PROCESSING OF ULTRA HIGH HARDNESS BORON CARBIDE

(71) Applicants: UNIVERSITY OF FLORIDA RESEARCH FOUNDATION, INC., Gainesville, FL (US); University of Central Florida Research Foundation, Inc., Orlando, FL (US)

(72) Inventors: Ghatu Subhash, Gainesville, FL (US); Richard Blair, Oviedo, FL (US)

(73) Assignees: UNIVERSITY OF FLORIDA RESEARCH FOUNDATION, INC., Gainesville, FL (US); UNIVERSITY OF CENTRAL FLORIDA RESEARCH FOUNDATION, INC., Orlando, FL (US)

(*) Notice: Subject to any disclaimer, the term of this patent is extended or adjusted under 35 U.S.C. 154(b) by 0 days.

(21) Appl. No.: 14/763,540

(22) PCT Filed: Jan. 27, 2014

(86) PCT No.: PCT/US2014/013160
§ 371 (c)(1),
(2) Date: Jul. 27, 2015

(87) PCT Pub. No.: WO2014/117071
PCT Pub. Date: Jul. 31, 2014

(65) Prior Publication Data
US 2016/0002115 A1    Jan. 7, 2016

Related U.S. Application Data

(60) Provisional application No. 61/756,862, filed on Jan. 25, 2013.

(51) Int. Cl.
C04B 35/563    (2006.01)
C04B 35/645    (2006.01)
(Continued)

(52) U.S. Cl.
CPC .......... C04B 35/563 (2013.01); C04B 35/645 (2013.01); F41H 5/0414 (2013.01);
(Continued)

(58) Field of Classification Search
CPC .................................................. C04B 35/563
(Continued)

(56) References Cited

U.S. PATENT DOCUMENTS 4,704,250 A * 11/1987 Cline ...................... B22F 3/001
                                                        419/14
4,961,778 A * 10/1990 Pyzik ...................... B22F 3/15
                                                        419/12
(Continued)

FOREIGN PATENT DOCUMENTS

JP      S59-016944 A  *  1/1984   ............ C22C 29/06
JP      2012-062210       3/2012
WO      WO 2009-051888    4/2009

OTHER PUBLICATIONS

Hong, N. et al., "Ni doping of semiconducting boron carbide," *Journal of Applied Physics*, 2010, pp. 024513 (1-7), vol. 107.
(Continued)

*Primary Examiner* — Noah Wiese
(74) *Attorney, Agent, or Firm* — Saliwanchik, Lloyd & Eisenschenk

(57) ABSTRACT

A super-hard material is a late transition metal doped $B_4C$ ceramic. The lightweight ceramics can display Vickers Hardness in excess of 45 GPa. Transition metals, such as Ni, Co, Rh, and Pd can be doped into the boron carbide at levels up to about 2.5%. A spark plasma sintering (SPS) of an evacuated powder of $B_4C$ and the transition metal at temperatures up to 2000° C., and pressures of up to about 100 GPa forms a super-hard material as a body. The late tran-
(Continued)

sition metal doped $B_4C$ ceramic can be used for armor, grinding materials, thermoelectric materials, and catalysts.

12 Claims, 3 Drawing Sheets

(51) Int. Cl.
*F41H 5/04* (2006.01)
*B23B 27/14* (2006.01)

(52) U.S. Cl.
CPC .......... *F41H 5/0492* (2013.01); *B23B 27/148* (2013.01); *C04B 2235/3821* (2013.01); *C04B 2235/405* (2013.01); *C04B 2235/408* (2013.01); *C04B 2235/5445* (2013.01); *C04B 2235/666* (2013.01); *C04B 2235/77* (2013.01)

(58) Field of Classification Search
USPC .......................................................... 501/87
See application file for complete search history.

(56) References Cited

U.S. PATENT DOCUMENTS

| | | | |
|---|---|---|---|
| 7,556,668 B2* | 7/2009 | Eason | B22F 3/15 |
| | | | 175/426 |
| 2006/0153728 A1 | 7/2006 | SchoeNung et al. | |
| 2010/0257997 A1 | 10/2010 | Kucherov et al. | |
| 2011/0002804 A1 | 1/2011 | Eason et al. | |
| 2013/0344316 A1* | 12/2013 | Hasanovic | C04B 41/009 |
| | | | 428/320.2 |

OTHER PUBLICATIONS

Hwang, S-D. et al., "Nickel doping of boron carbide grown by plasma enhanced chemical vapor deposition," *J. Vac. Sci. Technol. B*, Jul./Aug. 1996, pp. 2957-2960, vol. 14, No. 4.
Hwang, S-D. et al., "Fabrication of *n*-type nickel doped $B_5C_{1+\delta}$ homojunction and heterojunction diodes," *Appl. Phys. Lett.*, Feb. 24, 1997, pp. 1028-1030, vol. 70, No. 8.
Liu, C.H. et al., "Structural changes of boron carbide induced by Zr incorporation," *Journal of Materials Science*, 2000, pp. 387-390, vol. 35.
Liu, C.H. "Conductivity transition of semiconducting boron carbide by doping," *Materials Letters*, 2001, pp. 308-312, vol. 49.
Liu, J. et al., "The local structure of transition metal doped semiconducting boron carbides," *Journal of Physics D: Applied Physics*, 2010, pp. 085403 (1-8), vol. 43.
Mazurenko, E.A., "Volatile Metals Coordination Compounds as Precursors for Functional Materials Synthesis by CVD-Method," *Journal De Physique IV, Colloque C5, Supplement to Journal de Physique II*, Jun. 1995, pp. C5-547 to C-5-551, vol. 5.
Srivatsan, T.S. et al., Influence of $TiB_2$ content on microstructure and hardness of $TiB_2$-$B_4C$ composite, *Powder Technology*, 2005, pp. 161-167, vol. 159.

* cited by examiner

SYNTHESIS AND PROCESSING OF ULTRA HIGH HARDNESS BORON CARBIDE

CROSS-REFERENCE TO RELATED APPLICATIONS

This application is the U.S. national stage application of International Patent Application No. PCT/US2014/013160, filed Jan. 27, 2014, which claims the benefit of U.S. Provisional Application Ser. No. 61/756,862, filed Jan. 25, 2013, the disclosures of which are hereby incorporated by reference in their entireties, including any figures, tables, or drawings.

BACKGROUND OF INVENTION

Boron carbide is the lightest technical ceramic material and is extremely hard. Boron carbide is considered to have a chemical formula of $B_4C$, although most materials are slightly carbon deficient. Boron carbide is chemically inert, even to most acids, and has a high neutron absorbing cross section. Boron carbide can be hot-pressed into useful shapes for components with outstanding resistance to abrasive wear. $B_4C$ can be polished to a mirror finish. $B_4C$ has high elastic modulus (>435 GPa), high melting point (2450° C.), and high Hugoniot elastic limit (>18 GPa). Because of this unique combination of properties, $B_4C$ is an ideal candidate for many industrial, military and energy applications. $B_4C$ is used as a grinding medium for hard materials, in wear resistant sandblasting nozzles, in fast-breeder reactors and high-temperature thermoelectric conversion units, and as a lightweight ceramic armor material.

$B_4C$ has a hardness of ~30 GPa Vickers hardness, which is exceeded only by cubic boron nitride, ~48 GPa and diamond, ~115 GPa. Unlike diamond, $B_4C$ has a low thermal conductivity but a high thermal stability. Cubic boron nitride (cBN) has a high thermal stability but is only about half as hard as diamond. Major research efforts are directed towards development of super-hard materials with hardness above cBN. Because of their similar atom sizes in carbon and boron nitrides, it has been rationalized that synthesis of phases containing all three elements B, C, and N would yield materials with high hardness and other beneficial properties. A ternary phase B-C-N system, specifically a cubic $BC_2N$ phase ($cBC_2N$), has been prepared that has a Vickers hardness of ~76 GPa. The super-hard materials other than diamond, which is not stable under the conditions required, are attractive for high-speed cutting and polishing of ferrous alloys.

Modification of boron carbide is of interest with respect to augmenting or changing the properties of $B_4C$. Boron carbide is a semiconductor when the stoichiometry is $B>_4C$. The mildly p-type boron carbide, $B_5C$, prepared as a thin film by plasma enhanced chemical vapor deposition (PECVD), becomes an n-type semiconductor when doped with nickel. (Hwang et al., Nickel Doping of Boron Carbide Grown by PECVD, *J. Vac. Sci. Technol. BI*, 1996 14(4), 2957) In like manner, cobalt, iron, and manganese $B_5C$ films have been prepared by PECVD. (Liu et al., The Local Structure of Transition Metal Doped Semiconducting Boron Carbides *J. Phys. D: Appl. Phys.*, 2010 43 024513) Zirconium doped $B_{4.3}C$ semiconductor was prepared by hot pressing under a nitrogen atmosphere of a mixture of boron carbide powder ($B_{4.3}C$) and Zr nanocrystals at 0.5 atom %, to yield a mixed composition of $B_{4.3}C$, $(BN)_4H$, and $(ZrB_2)_3H$ by XRD analyses. (Liu et al., Structural Changes of Boron Carbide Induced by Zr Incorporation, Journal of Materials Science 200 35 387) Hot pressing of $B_{4.3}C$ with nickel at 0.5 atom % under the same conditions resulted in a doped structure with Ni incorporated in the $B_{4.3}C$ crystals, as revealed by XPS and SPM analysis. (Liu, Conductivity Transition of Semiconducting Boron Carbide by Doping, *Materials Letters* 2001 49 308) No characterization of transition metal doped materials other than their semiconducting behavior has been disclosed.

Hence, there is a need for a super-hard material that is relatively inexpensive, with the hardness of cBN or better. Modification of $B_4N$ to achieve a super-hard material would be advantageous.

DETAILED DISCLOSURE

Figure 1:
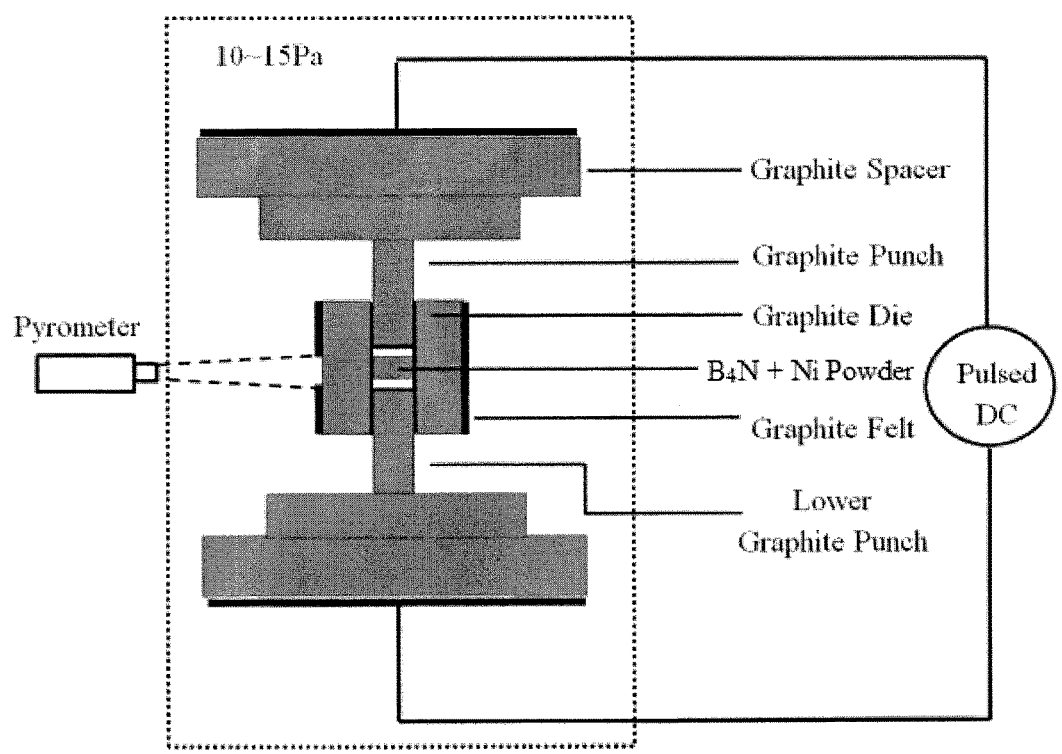
FIG. 1 shows a schematic of a die assembly and sintering chamber of a spark plasma sintering (SPS) device, as used in embodiments of the invention.

An embodiment of the invention is directed to a super-hard ceramic material comprising a late transition metal doped $B_4C$. For example, the transition metal can be Co, Ni, Rh, or Pd and can be included up to about 2.5 atom %, for example, about 0.5 to about 2.0 atom % in the doped $B_4C$. In an embodiment of the invention, the material is prepared as a shaped part by spark plasma sintering (SPS) where an evacuated metal and $B_4C$ mixed powder is compressed at a high pressure and appropriate temperature with a current pulsed through the mixture. By employing the SPS process, the hardness of the late transition metal doped $B_4C$ can be increased by 25%, 50%, or more, where the hardness can be similar or superior to that of cubic boron nitride. For example a 1 atom % Ni doped $B_4C$ can have a Vickers Hardness in excess of 35 GPa, in excess of 40 GPa, or in excess of 45 GPa, which are in excess of the 25 to 35 GPa that is observed for commercially available $B_4C$.

Hardness of a material is defined as the resistance to plastic deformation and is almost linearly related to the shear modulus of the hard materials. The crystal structure modification imposed by doping of the $B_4C$ improves the mechanical properties of the $B_4C$. Although not to be bound by theory, doped $B_4C$ composition, according to embodiments of the invention, are designed to improve structural order and the interconnectivity of the unit cell of the material by increasing electron density of the material without diminishing the covalent nature of the bonds in $B_4C$. Amorphization of boron carbide under high-pressure transient loads can be viewed as a lack of interconnectivity, a structural disorder, in the unit cell. Boron carbide can be considered as a boron lattice with added carbon. Boron has three valence electrons and carbon has four. The addition of carbon imparts an increase of valence electron density, which results in an increase of the bulk modulus of the material from 213 GPa for α-boron, to 247 GPa for $B_4C$, as the valence electron density increases from 0.391 $e^-/Å^3$ for α-boron, to 0.435 $e^{31}/Å^3$ for $B_4C$. Boron and carbon comprising portions of the $B_4C$ exist as discrete $B_{11}C$ and $C_2B$ units, which undergo displacement under the application of a high transient load. Although boron carbide possesses a high degree of covalency in the form of covalent B—B and C—C bonds, it lacks a high valence electron density. Doping with the late transition metal increases the hardness and bulk modulus by enhancing electron density, which improves the ability of $B_4C$ materials to resist amorphization by reducing formation of slip planes. Pristine boron carbide is a p-type material, which is consistent with a low-electron density structure. Increasing the valence electron density of $B_4C$ is achieved by introducing the n-type dopants, which, according to embodiments of the invention, are the late transition metals. By adding late transition metal dopants, electron density of the material is increased without decreasing the covalency in the structure, as the dopants occupy interstitial sites in the $B_4C$ lattice.

The super-hard materials are prepared by spark plasma sintering (SPS). Spark plasma sintering (SPS), also known as pulsed electric current sintering (PECS), is a field assisted sintering technique that allows production of fully dense materials while applying high heating rates and short dwell times. A pulsed DC current is passed through the punches, die, and, in some cases, the specimen, depending on its electrical properties. SPS is a technique developed for the rapid densification of ceramic materials, hard-metals, cermets, Al-based alloys, and other metallic powders. In embodiments of the invention, transition metal doped $B_4C$ materials are prepared at relatively low temperatures in very short periods of sintering powders to yield large grain sizes and high hardness.

SPS sintering employs localized resistive heating of a powder compact through the application of low DC voltage, for example, 5V, and high ampere, for example, 3000 A, direct current. The powder is loaded into a graphite die and the application of a pulsed voltage facilitates bonding of powder particles over a short consolidation period, for example, 2-10 minutes with an applied external pressure, for example, 80 MPa or less. Rapid consolidation results in minimal grain growth.

The doped $B_4C$ powders can contain various concentrations of metal dopants, for example, 500 to 2000 ppm, and can be consolidated under high vacuum without the use of sintering aids. SPS processing of the late transition metal doped $B_4C$ can be carried out, for example, at temperatures of about 1500° C. to about 2000° C., with pressures of about 20 to about 100 MPa for a period of about 2 to about 30 minutes. For example, a mixture of fine Ni and boron carbide powders can be mixed and placed in a die assembly that is placed into a sintering chamber, which is depressurized, for example, to less than 100 Pa, to less than 50 Pa, to less than 30 Pa, to less than 20 Pa, to 10 Pa, to less than 10 Pa, or any pressure that permits sufficient removal of gas from within the loaded mixture. Subsequently heat, pressure, and a pulsing current, for example, of 100 to 8000 A, of 200 to 2000 A, of 300 to 1500 A, of 400 to 1000 A, of 600 to 800 A, or any current or current range that promotes densification of the loaded fuel pellet precursor, can be applied. An on-off current pulse can have any workable ratio, for example, an on-off ratio of 6:1.

The transition metal doped $B_4C$ can be prepared by combining the metal with the boron carbide. Combination can be admixing $B_4C$ and metal powders in the desired proportions. The doping process can involve mixing of $B_4C$ and, for example, Ni powders using, for example, a ball mill for several hours to ensure proper mixing and occurrence of solid-state reaction. Alternatively, the metal can be introduced through diffusion by annealing $B_4C$ with the desired metal at elevated temperatures for extended periods. Alternatively, the metals selected for doping can be combined with the $B_4C$ using wet chemical methods where the reduction of a metal salt in the presence of the $B_4C$ powders yields a metal coating boron carbide powder that is subsequently annealed at high temperature, where, advantageously, dopant levels are controlled without the risk of milling media contamination. Alternatively, metal dopants can be incorporated into $B_4C$ by inclusion with metal-containing precursor compound, such as: metal β-diketonate complexes, for example, the metal complexed with 2.4-pentadione, 1,1,1-trifluorine-2.4-pentadione, 1,1,1,5,5,5-hexafluorine-2,4-pentadione, or 1.1.1.2.2,3,3-heptafluorine-4,6-heptanedione; metal hydrides; metal borohydrides; metal carbonyls; and metal trifluorophosphines; organo metal complexes, for example, metals complexed with cyclopentadienes, arenes, or allyls; which decompose into atomic metal and gaseous by-products at elevated temperatures under a non-oxidizing or reducing atmosphere.

$B_4C$ is a thermoelectric material with poor electrical properties. If a dopant is used that does not inhibit amorphization, properties due to a loss in thermal conductivity can be combined with an increase in electrical conductivity due to the dopant. According to embodiments of the invention, this permits materials that are n-doped but still exhibit amorphization, which provide reduced thermal conductivity while displaying greater conductivities than $B_4C$ for use as an improved thermoelectric material. In an embodiment of the invention, because the doped $B_4C$ is hard and corrosion resistant, materials with improved electrical conductivity are useful for catalyst supports where there is electrical communication between individual catalyst particles. According to an embodiment of the invention, the metal dopant, such as Ni, may provide catalytic properties, particularly where the band gap is increased significantly from that of $B_4C$. The doped materials, according to embodiments of the invention, are useful in water electrolysis, solid oxide fuel cells, direct methanol fuel cells, and traditional hydrocarbon chemistry. The proposed materials can be employed as improved thermoelectric materials, cutting tools, and catalysis.

Methods and Materials

Boron carbide powder (Grade HS, H. C. Starck, Germany) with particle size of about 200 nm and a Ni powder (Alfa Aesar) were purchased. The powders were mixed using a SPEX mill to produce a 1 atom % Ni in $B_4C$ mixture.

SPS was performed using a Dr. Sinter® SPS-1030 system, where the die assembly is illustrated in FIG. 1. The mixed powder was placed in a graphite die and closed using two punches on either side. It was then consolidated using spark plasma sintering (SPS) under high vacuum (26-40 Pa) without the use of any sintering aids. A maximum current of 2000 amp was used and sintering was performed at a temperature of 1600° C., with a consolidation time between 2 to 30 minutes. Cylindrical disks of up to 25 mm diameter and 6.4 mm thickness were sintered in this manner.

Mixed 1 atomic % Ni and boron carbide powder was sintered at a temperature of 1600° C. for 5 minutes at a pressure of 60 MPa. Hardness measurements were performed on the sintered compact. Vickers hardness measurements were conducted at 300 g, 500 g, 700 g, 1 Kg and 1.5

Figure 2:
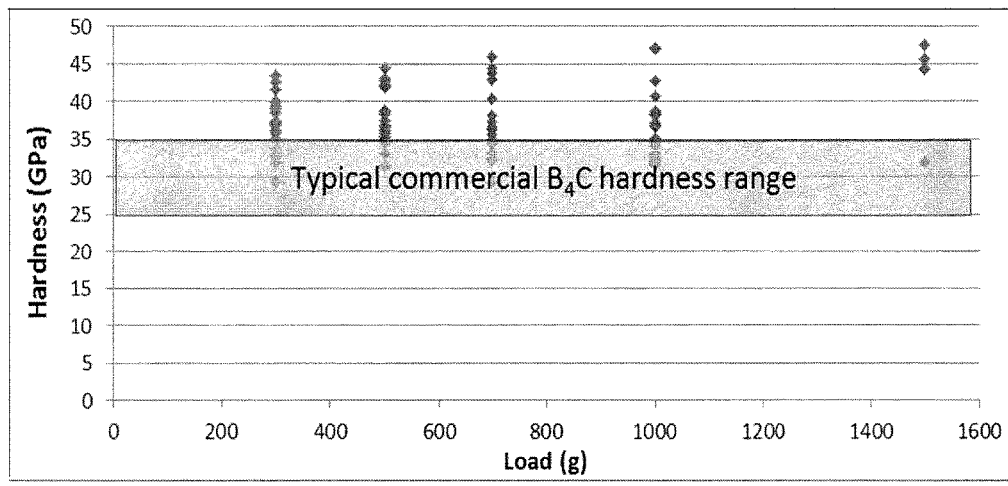
FIG. 2 shows a plot of Vickers Hardness for a 1 atom % Ni doped $B_4C$, according to an embodiment of the invention, for various applied loads, in comparison to that from commercially available $B_4C$.
Figure 3:
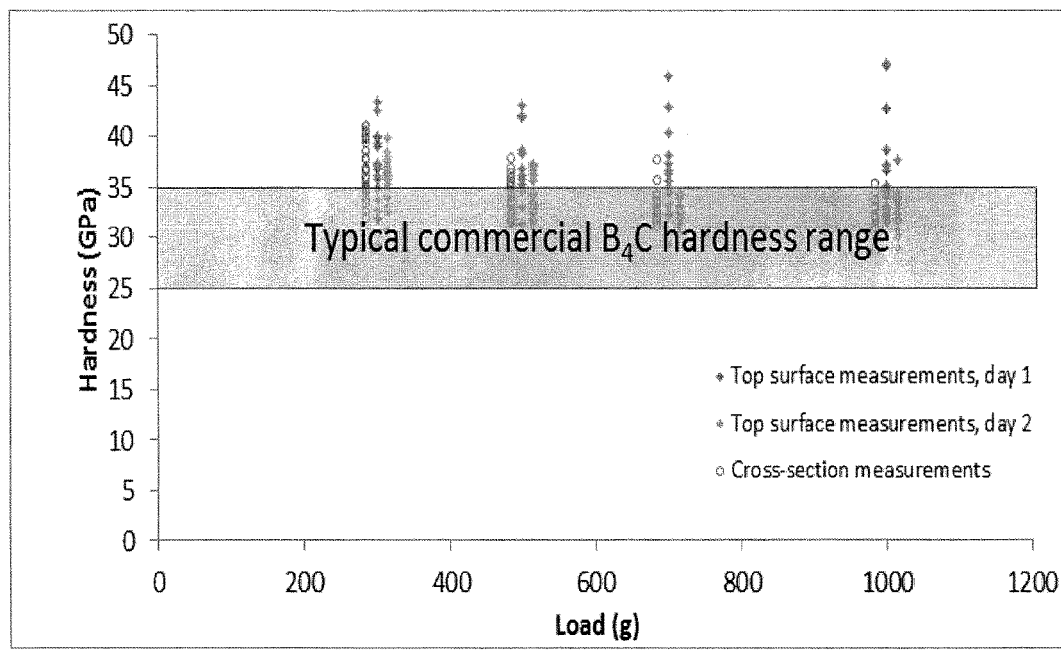
FIG. 3 shows a plot of Vickers Hardness for a 1 atom % Ni doped $B_4C$, according to an embodiment of the invention, for various applied loads, sample orientation, and time, in comparison to that from commercially available $B_4C$.
Figure 4:
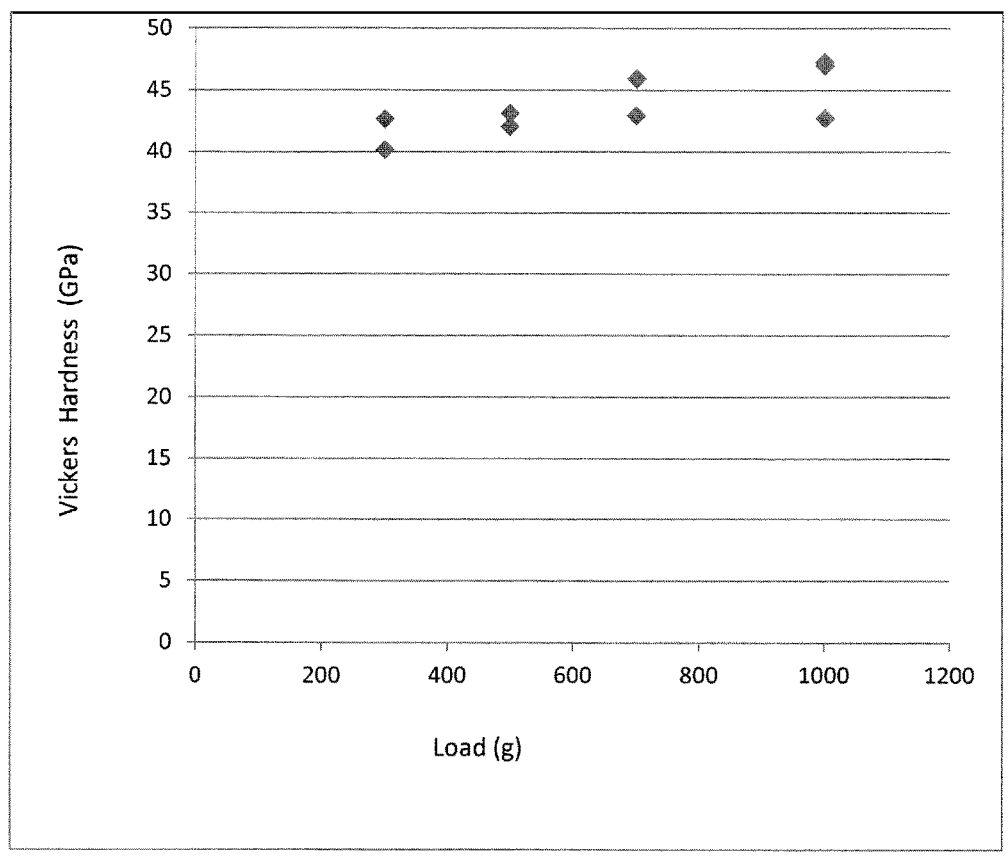
FIG. 4 shows a plot of Vickers Hardness for a 1 atom % Ni doped $B_4C$, according to an embodiment of the invention, for various applied loads for large samples prepared from SPS of very homogeneous powders in comparison to that from commercially available $B_4C$.

Kg applied loads, with at least four measurements at different locations on each pellet performed at each load, as plotted in FIG. 2. Hardness measured from the cross section was similar to that measured from the top surface. The hardness was similar when measured on the first and second day and remained harder than that of commercially available $B_4C$. The scatter observed in FIGS. 2 and 3 is attributed to non-uniform distribution of dopant and non-uniformity in consolidated density of the specimen. Hardness values of up to 48 GPa, and consistently in excess of 40 GPa were observed for the Ni doped $B_4C$, as plotted in FIG. 4, for large cylindrical disks. Ultrasonic measurements in both longitudinal and shear wave velocity were conducted on each pellet to determine the pellet's Young's modulus. Archimedes' method was used to determine the density of a pellet of the 1 atom % Ni doped $B_4C$. Parameters and results of these tests are tabulated below.

TABLE 1

Parameters and Calculated Results for 1 atom % Ni doped $B_4C$ samples for Ultrasonic and Density Measurements

| | |
|---|---|
| Longitudinal Time (s) | 1.74E-06 |
| Shear Time (s) | 2.80E-06 |
| Thickness (m) | 0.01157 |
| Longitudinal Velocity (m/s) | 13337.56 |
| Shear Velocity (m/s) | 8264.524 |
| Mass in air (g) | 9.05 |
| Mass in water (g) | 5.4 |
| Density (kg/m$^3$) | 2479.452 |
| Poisson's Ratio | 0.188368 |
| Young's Modulus (GPa) | 402.506 |
| Shear Modulus (GPa) | 169.3524 |

All publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A super-hard material, comprising a single phase late transition metal doped boron carbide, wherein the Vickers Hardness is greater than 35 GPa, wherein the late transition metal is Ni, Co, Rh, Pd, or other Group 9 or Group 10 transition metal.

2. The super-hard material of claim 1, wherein the boron carbide is $B_4C$.

3. The super-hard material of claim 1, wherein the late transition metal is 0.5 to 2 atom %.

4. The super-hard material of claim 1, wherein the late transition metal is Ni at 1 atom %.

5. The super-hard material of claim 1, wherein the Vickers Hardness is greater than 45 GPa.

6. A method for preparing a super-hard material comprises:
preparing a mixture of a late transition metal and $B_4C$ powder, wherein the late transition metal is Ni, Co, Rh, Pd or other Group 9 or Group 10 transition metal;
loading a die assembly with the powder;
placing said die assembly in a sintering chamber of a spark plasma sintering (SPS) apparatus;
evacuating the chamber; and
applying a pulsed current, pressure, and heat.

7. The method of claim 6, wherein the late transition metal is 0.5 to 2 atom % of the mixture.

8. The method of claim 6, wherein the sintering chamber is evacuated to 40 Pa or less.

9. The method of claim 6, wherein heating is to 1,000 to 2,000° C.

10. The method of claim 6, wherein the maximum pressure is 100 GPa.

11. An armor component, comprising a single phase late transition metal doped boron carbide with a Vickers Hardness in excess of 35 GPa, wherein the late transition metal is Ni, Co, Rh, Pd, or other Groin 9 or Group 10 transition metal.

12. A cutting medium, comprising a single phase late transition metal doped boron carbide with a Vickers Hardness in excess of 35 GPa, wherein the late transition metal is Ni, Co, Rh, Pd or other Group 9 or Group 10 transition metal.

* * * * *

UNITED STATES PATENT AND TRADEMARK OFFICE
CERTIFICATE OF CORRECTION

PATENT NO.         : 9,604,885 B2                          Page 1 of 1
APPLICATION NO.    : 14/763540
DATED              : March 28, 2017
INVENTOR(S)        : Ghatu Subhash and Richard Blair It is certified that error appears in the above-identified patent and that said Letters Patent is hereby corrected as shown below:

In the Specification

Column 3,
Line 4, "to 0.435 $e^{31}/Å^3$" should read --to 0.435 $e^-/Å^3$--.

In the Claims

Column 6,
Line 35, Claim 11 "or other Groin 9" should read --or other Group 9--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*